(12) United States Patent
Jeanty et al.

(10) Patent No.: US 10,938,218 B2
(45) Date of Patent: Mar. 2, 2021

(54) SOLAR TRACKER SYSTEM

(71) Applicant: SunPower Corporation, San Jose, CA (US)

(72) Inventors: Cedric Jeanty, Davis, CA (US); Jason Charles Jones, Berkeley, CA (US); Zachary Judkins, Berkeley, CA (US); Ramakrishna Jupalli, Richmond, CA (US); Jacob Marshall, Lafayette, CA (US); Sy Olson, Oakland, CA (US); Bart Wiktorowicz, Richmond, CA (US)

(73) Assignee: SunPower Corporation, San Jose, CA (US)

( * ) Notice: Subject to any disclaimer, the term of this patent is extended or adjusted under 35 U.S.C. 154(b) by 392 days.

(21) Appl. No.: 15/261,378

(22) Filed: Sep. 9, 2016

(65) Prior Publication Data

US 2017/0187192 A1    Jun. 29, 2017

Related U.S. Application Data

(60) Provisional application No. 62/271,874, filed on Dec. 28, 2015.

(51) Int. Cl.
| | | |
|---|---|---|
| *H02J 3/00* | (2006.01) | |
| *H02J 3/38* | (2006.01) | |
| *H02S 20/32* | (2014.01) | |
| *H02M 7/44* | (2006.01) | |

(52) U.S. Cl.
CPC .............. *H02J 3/385* (2013.01); *H02M 7/44* (2013.01); *H02S 20/32* (2014.12)

(58) Field of Classification Search
CPC ....................................................... H02J 3/385

USPC .......................................................... 307/77
See application file for complete search history.

(56) References Cited

U.S. PATENT DOCUMENTS

| | | |
|---|---|---|
| 7,958,886 B2 | 6/2011 | Barsun et al. |
| 8,101,849 B2 | 1/2012 | Almy et al. |
| 8,484,434 B2 | 7/2013 | Caprioli |
| 8,674,279 B1* | 3/2014 | Thel .......................... F24J 2/38 |
| | | 136/244 |
| 9,353,970 B2 | 5/2016 | Linderman |

(Continued)

FOREIGN PATENT DOCUMENTS

| | | |
|---|---|---|
| KR | 10-2012-012896 A | 11/2012 |
| WO | WO2014192014 A2 | 12/2014 |

OTHER PUBLICATIONS

International Search Report and Written Opinion, PCT Application: PCT/US2016/067083, dated Mar. 28, 2017.

(Continued)

*Primary Examiner* — Rexford N Barnie
*Assistant Examiner* — Dru Parries
(74) *Attorney, Agent, or Firm* — Grasso PLLC

(57) ABSTRACT

Solar tracker systems having several rows of photovoltaic strings individually actuated by respective tracker control systems, are described. In an example, a solar tracker system includes a tracker control system having a tracker controller powered by forward-fed power from a photovoltaic string, e.g., during daytime, and powered by back-fed power from a station hub, e.g., during nighttime. Methods of operating the solar tracker system to forward-feed or back-feed power to the tracker control system are also described.

19 Claims, 13 Drawing Sheets

(56) References Cited

U.S. PATENT DOCUMENTS

| | | |
|---|---|---|
| 2009/0050192 A1 | 2/2009 | Tanaka et al. |
| 2010/0302819 A1 | 12/2010 | O'Brien et al. |
| 2011/0303213 A1 | 12/2011 | Kraft |
| 2012/0032665 A1 | 2/2012 | Shaver et al. |
| 2012/0139352 A1 | 6/2012 | Allen et al. |
| 2012/0216852 A1 | 8/2012 | Almy et al. |
| 2013/0200702 A1 | 8/2013 | Schoppner |
| 2014/0070619 A1 | 3/2014 | Fornage |
| 2014/0211529 A1 | 7/2014 | Kandasamy et al. |
| 2014/0327314 A1 | 11/2014 | Gerhardinger et al. |
| 2016/0079914 A1 | 3/2016 | Wu |
| 2016/0176305 A1* | 6/2016 | James ................ B60L 11/1816 307/26 |
| 2017/0093329 A1* | 3/2017 | Jensen ................ H02S 20/32 |
| 2017/0187192 A1 | 6/2017 | Jeanty |
| 2018/0026550 A1 | 1/2018 | Dent |

OTHER PUBLICATIONS

PCT International Search Report and Written Opinion PCT Application PCT/US2017/039193 dated Oct. 30, 2017.

* cited by examiner

SOLAR TRACKER SYSTEM

CROSS-REFERENCE TO COMMONLY OWNED CO-PENDING APPLICATION

The present application is related to, claims the benefit of, and claims priority under 35 U.S.C. § 119 to U.S. provisional patent application 62/271,874, which was filed on Dec. 28, 2015, and is entitled Solar Tracker System. The contents of the '874 application are incorporated herein by reference in their entirety.

TECHNICAL FIELD

The present disclosure relates to repositionable photovoltaic (PV) panels and more specifically to systems, processes, and devices related to powered repositioning of one or more PV panels.

BACKGROUND

Photovoltaic (PV) cells, commonly known as solar cells, are well known devices for converting solar radiation into electrical energy. PV cells can be assembled into PV panels, which may also be used to convert sunlight into electricity. The electricity produced by the PV panels may be conditioned and transmitted to a power grid for residential and/or commercial use.

Solar tracker systems are used to point a PV panel towards the sun during daytime, and to move the PV panel as needed during nighttime. The tracker system can include a positioning motor and support structure enabling the support and movement of the PV panel. As the motor is activated, the applicable support structure can serve to reposition the PV panel from a first position to a second position.

BRIEF DESCRIPTION OF THE DRAWINGS

Non-limiting features of embodiments are provided in the figures of the accompanying drawings, in which like references indicate similar elements.

DETAILED DESCRIPTION

Figure 1:
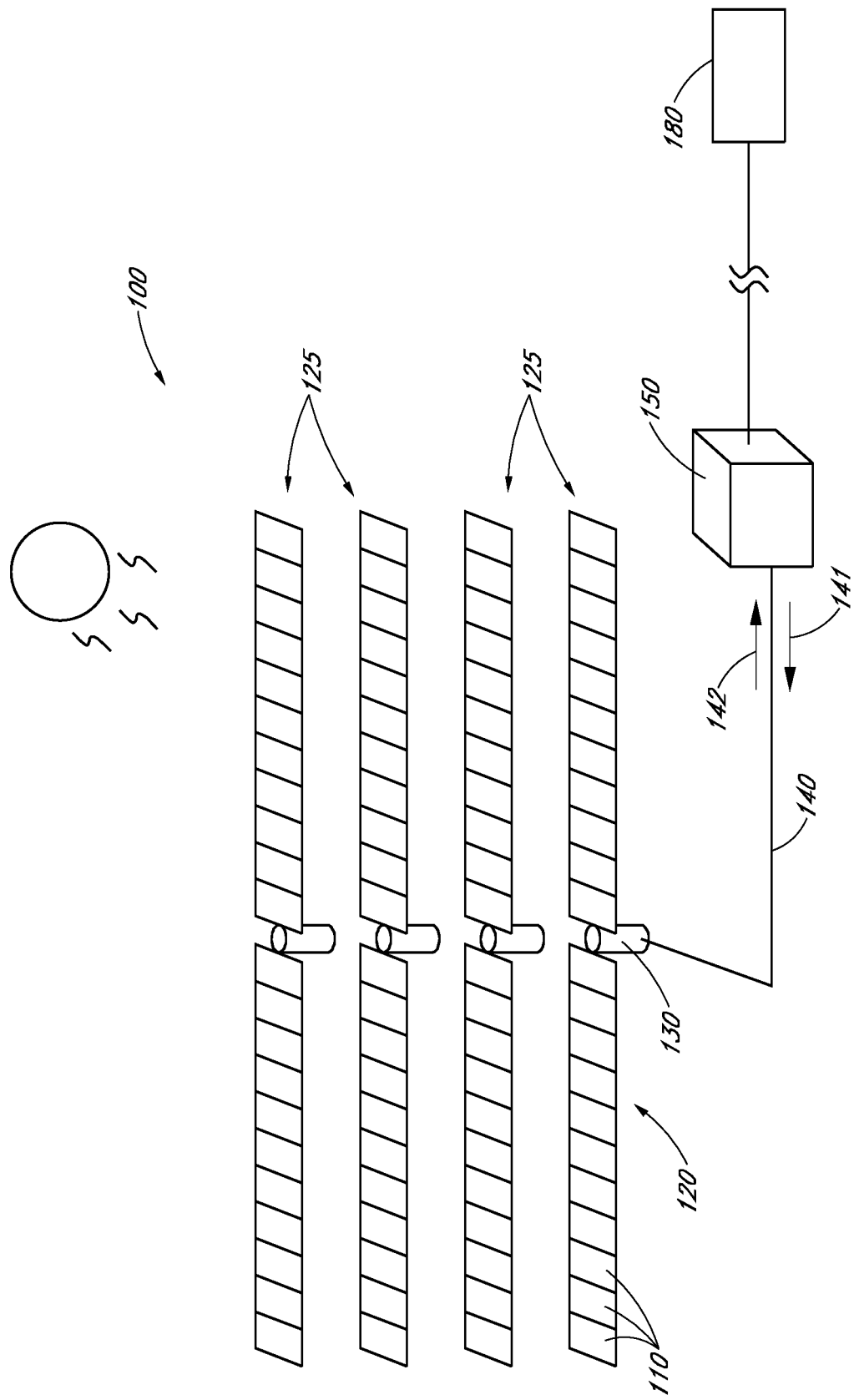
FIG. 1 shows a schematic of an installed solar array with tracker system as may be employed in embodiments.

Tracker systems serve to move one or more PV panels between various positions. These positions may include some preferred for optimum collection of solar rays, as well as: nighttime positions; defensive positions as may be employed for storms; and cleaning positions as may be employed for cleaning or otherwise maintaining one or more PV panels. PV panels may be ganged together as a one-dimensional array with several PV panels in a row and as a two-dimensional grid with PV panels positioned along both an x-axis and a y-axis. Tracker systems may be employed to move a PV panel or multiple PV panels between various positions and at various intervals. This movement may include discrete periods of motion followed by discrete stationary periods. The periods of motion may be on the order of seconds as well as minutes or hours and so too may the stationary periods. The movement may occur when the PV panel is generating electricity as well as when the panel is quiescent and not generating any electricity.

Embodiments provide various features of systems, processes, and article of manufacture involved in solar arrays with tracker systems. These embodiments may include features where power to move one or more of the PV panels uses cabling also used to deliver electricity generated by one or more of the PV panels. These embodiments may also include features where local power storage at a PV tracker module is not needed and where PV tracker modules may provide multiple services including commissioning, position reporting, system management, inclination reporting, and orientation adjustment.

The following detailed description is merely illustrative in nature and is not intended to limit the embodiments of the subject matter, the application, and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" location does not necessarily imply that this location is the first location in a sequence; instead the term "first" is used to differentiate this location from another location (e.g., a "second" location).

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

In addition, certain terminology may also be used in the following description for the purpose of reference only, and thus are not intended to be limiting. For example, terms such as "upper," "lower," "above," "below," "in front of," and "behind" refer to directions in the drawings to which reference is made. Terms such as "front," "back," "rear," "side," "outboard," "inboard," "leftward," and "rightward" describe the orientation and/or location of portions of a component, or describe the relative orientation and/or location between components, within a consistent but arbitrary frame of reference which is made clear by reference to the text and the associated drawings describing the component(s) under discussion. Such terminology may include the words specifically mentioned above, derivatives thereof, and words of similar import.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

Tracker systems may be used in large-scale solar installations with incorporated motor-driven linkage systems that control several rows of PV strings at once. Such multi-row solar tracker systems are limited in that they do not allow individual movement of a single row of PV strings. Solar tracker systems may be powered by various systems and topologies including dedicated power cables supplying power from the power grid and dedicated power cables providing power recycled from stored PV panel-generated electricity.

Embodiments can provide PV panel control and manipulation at the string and individual PV panel level. This control may be powered by the power grid, by power recycled and stored from PV panel-generated electricity, and from other sources as well. In embodiments, string or individual panels may be moved by their own tracker module and may be controlled locally and upon receiving instructions from a system wide tracker system. Power supplied to the tracker modules may pass over cabling used to transmit electricity away from the PV panels when the panels were generating electricity. Thus, embodiments may provide a solar tracker system having row-level actuation and control and may employ an electrical architecture that does not require every tracker controller to be powered by its own power cable and/or dedicated PV panel. Embodiments may also prevent the need for local battery storage at a PV tracker module to power movement of that PV tracker module or another PV tracker module.

In some embodiments, a tracker system for a solar array may include a PV string tracker module configured to move a linear array of PV panels. This tracker module, which may include a motor, transmission, and logic controls. This module may be powered by forward-fed power from a row or rows of PV strings as well as powered by back-fed power delivered from a station hub of the solar tracker system or other source. This back-fed power may use the same transmission cabling that carries the forward-fed DC or AC power from a row or rows of PV panels and, sometimes to a power grid. The station hub or other system manager may include a station controller configured to determine whether to operate the solar tracker system in a forward-fed mode or a back-fed mode. When operating in the forward-fed mode, the forward-fed power may be transmitted to the power grid through multiple micro-inverters, a central inverter, and combinations thereof. When operating in the back-fed mode, the back-fed power may be transmitted from a station hub to one or more PV string tracker modules. Accordingly, a row-level actuation paradigm may be implemented using the same cabling that supplies power from the PV panels to feed power to the PV string tracker module during periods when the PV panel array is not generating power, e.g., nighttime. The row-level actuation paradigm shift with back-fed power may, therefore, in embodiments, provides two-way cabling usage and can reduce the need for additional power cabling for powering the PV string tracker modules of a solar tracker system. The two-way cabling may also serve to reduce or eliminate the need for local battery storage at or near the PV string tracker modules to power the movement of these PV string tracker modules.

Embodiments may provide PV panel string level actuation as well as control and management features for this actuation or for other functionality. Strings may be independently controlled and managed, which may include discrete control of PV panel strings and discrete control and management of PV string tracker modules. PV string modules may each include independent controllers that may be powered from parasitic PV panel power during portions of the day. For example, forward-fed voltages may be used to power the local controllers along with the motors and other components of the PV string tracker modules during sunny portions of the day. These forward-fed voltages may be in a range of 600-1500 VDC and may have other voltage values as well. In preferred embodiments voltages lower than forward-fed voltages from the PV panel string may be used for back-fed voltages such that a controller monitoring line voltages can readily determine whether a voltage is a forward-fed voltage from the PV panels or a back-fed voltage intended to power the PV string tracker modules.

Communication between various components of the solar array tracker system may be over power lines, dedicated communication lines or preferably using wireless protocols for local component communications and for reaching network interfaces. The components of the tracker system may be self-commissioning and may be configured to poll other components in the solar array within the solar array tracker system for initial configurations and set-ups as well as during operation to manage operations and changes in status, component presence, component configuration status, component position, component inclination, and component operational status.

Embodiments may use the individual module controllers to determine PV panel inclination and may, therefore, need not employ independent inclinometers for each PV panel or string of PV panels. Embodiments may forego local energy storage to power local actuators as well as for powering local controllers or other components. In embodiments, normal end of day backtracking may be performed using parasitic power as well as back-fed power and may depend on the status of available parasitic power. During dark periods communications with the PV tracker modules may be stopped and the modules may enter quiescent modes of operation. Also, PV panel strings may be moved in unison at night but preferably, may be moved individually or in smaller sub-sets in order to manage the amount of back-fed power needed for the movement. During periods of dusk or low light parasitic power is preferably sufficient to power movement of individual PV tracker modules.

Communication between the PV modules, station hub, and any interim station controller may use PLC techniques as well as wireless techniques and preferably may include bandwidth for future data use. This communication may provide support for automated commissioning of the PV tracker modules as well as other sub-systems of the solar tracker system. The calibration performed in embodiments may include locating individual components relative to the sun, relative to a shared reference of Cartesian coordinates, and relative to a target orientation, e.g., southwest, etc. The Cartesian coordinates may determine and chronical yaw, pitch, and roll for each PV panel as well as strings of PV panels. These determinations and recordings may occur at start-up and at various times during the operational lifecycle of the PV panels. The calibration may also continue for longer periods of time to detect operational efficiency of a PV panel or panels and for calculating system offsets, such as expected shading and the like. This calibration may include reading current for a day or more.

FIG. 1 shows a schematic view of an installed solar tracker system as may be employed in embodiments. A solar tracker system 100 may include individually-actuated PV string rows 125 installed in a predetermined location and orientation relative to the sun. Each PV string row 125 may include one or more PV panel strings 120. For example, two or more PV panel strings 120 may be combined in a row and mechanically connected to a drive system of a corresponding PV string tracker module 130. Furthermore, each PV string may include several PV panels 110 electrically connected in series. Thus, a PV string tracker module 130 may individually move a corresponding PV string row 125 to orient the PV panels 110 of the PV strings 120 as needed for effective system operation. For example, the PV string tracker module 130 may point the PV panels 110 toward the sun to maximize PV electrical generation during daytime, or the tracker module 130 may move the PV panels 110 into a stowed position, e.g., for nighttime or weather stowage. Accordingly, the tracker module 130 may require electrical power at all times, including daytime and nighttime.

In embodiments, the tracker module 130 may be powered by forward-fed power 142 from a corresponding PV string, or the tracker module 130 may be powered by back-fed power 141 delivered from a station hub 150 of the solar tracker system 100. The forward-fed power 142 may correspond, for example, to a rated system power generated by the combined PV string rows. For example, the rated system power may include power supplied by the PV strings 120 to a power cable running between the PV string rows 125 and the station hub 150. Each PV string may be electrically connected in parallel with the other PV strings, and thus, the rated system power may have a rated system voltage corresponding to a rated voltage of the PV strings. For example, in an embodiment, the rated system voltage may be greater than 1000 volts, e.g., 1500 volts. As described below, the station hub 150 may be capable of back-feeding electrical power from the power grid 180 through the power cable 140 to the PV string rows at a lower voltage than the rated system voltage. By way of example, the back-fed power may have a back-fed voltage less than 10% of the rated system voltage, e.g., less than 100 volts, such as 48 volts. Accordingly, power cable may have power available at all times, i.e., forward-fed power or back-fed power, to power the tracker module 130 of the solar tracker system 100.

Figure 2A:
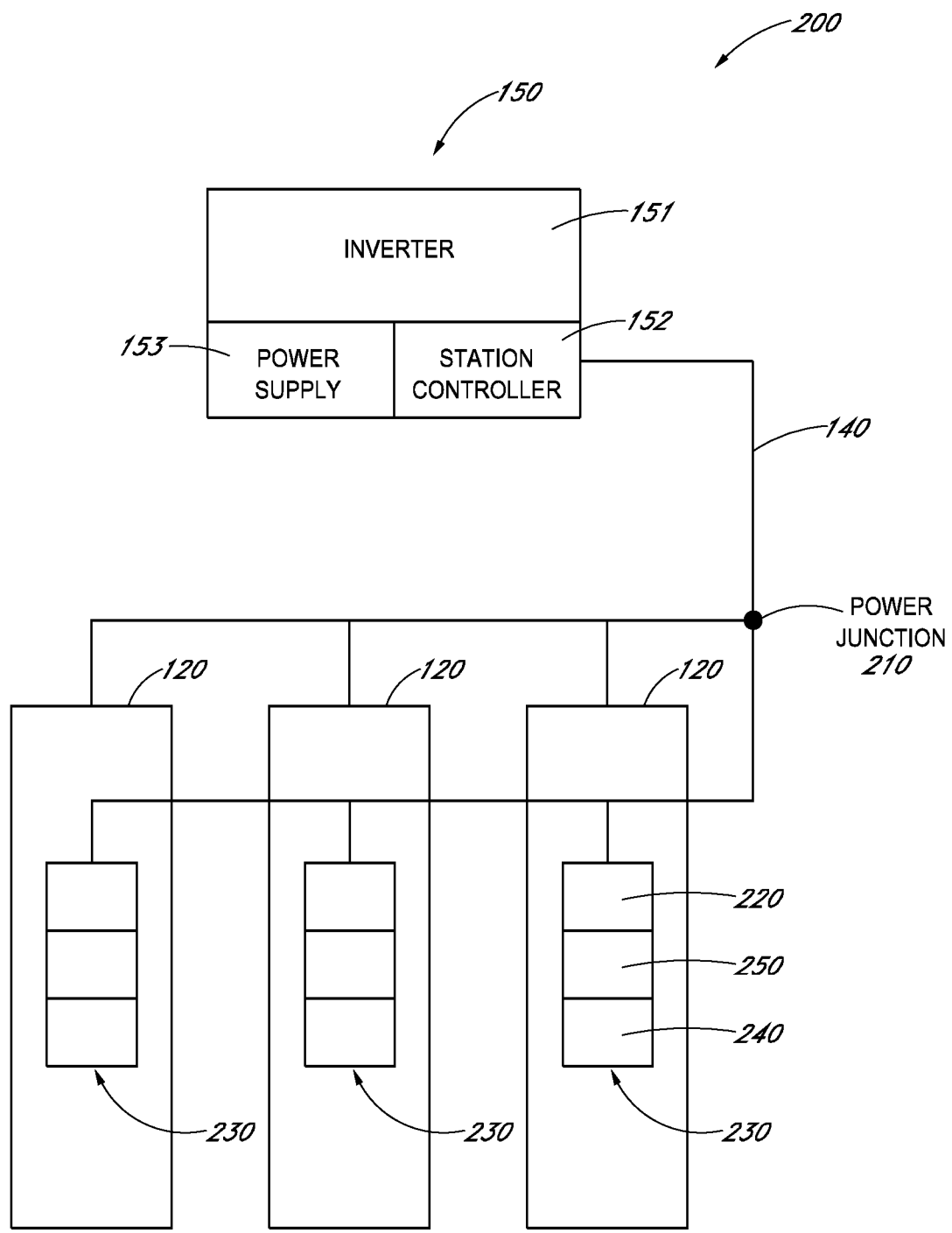
FIGS. 2A-2B show schematics of a solar array with tracker system as may be employed in embodiments.

FIG. 2A shows a schematic view of a solar array with solar tracker system 200 as may be employed in embodiments. Like in FIG. 2B, this tracker system 200 has string level actuation topology as well as system level topology. Labeled in FIG. 2A are a station hub 150, an inverter 151, a power supply 153, a station controller 152, a power cable 140, a power junction 210, PV panel strings 120, PV string tracker modules 230, a first module actuator 220, a second module actuator 240, and a module controller 250. The solar tracker system 200 may include a power junction 210, which may be a physical electrical connector and have an arbitrary or chosen location along the power cable 140.

As explained in more detail below, the power junction 210 may be located at a point along the power cable 140 that is electrically connected to one or more PV strings 120 and to the tracker modules 230 corresponding to the PV strings. For example, a PV string 120 may be electrically connected to the power junction 210 to output the forward-fed power to the power junction 210. Similarly, the string tracker modules 230 and module controller 250 may be electrically connected to the power junction 210 in parallel with the PV panel strings 120.

The power junction 210 may be at a first end of the power cable 140 closest to and connected with the PV panel strings 120. The power cable 140 may also have a second end opposite from the power junction 210, and the second end may be connected to the station hub 150 of the solar tracker system. More particularly, the power cable 140 may be electrically connected with one or more of an inverter 151 and a power supply 153 of the station hub 150. As described below, the station hub 150 may also include a station controller 152 to determine whether to operate the station hub in a forward-fed mode or a back-fed mode. Depending on the operation mode, the inverter 151 may receive the forward-fed power from the power junction 210, e.g., when the station hub 150 is operating in the forward-fed mode, or the power supply 153 may output the back-fed power to the power junction 210, e.g., when the station hub 150 is operating in the back-fed mode.

In embodiments, the string tracker modules 230 may include one or more panel actuators and a tracker controller. In embodiments, one of the tracker actuators may be a brake or a gear set or other mechanical actuator. One or more of the tracker control system components may be electrically connected to the power junction in parallel with the PV string.

In embodiments, the station controller 152 may send state commands such as stow, track, maintenance, and report to individual controllers of the string tracker modules 230. These commands may be sent via Power Line Communications (PLC), using dedicated wiring, or preferably using wireless protocols such as Bluetooth®, ZigBee, Z-Wave, WLAN, WPA, WEP, 802.11b, 802.11a, 802.11g, 802.11n, and 802.11ac. The station controller 152 may listen for reports from the module controllers 250 as well as for other sources where these reports can provide information regarding system status and individual string tracker module 230 status, e.g. string power, motor faults, temperature, string position, etc. The station hub 150 may, therefore, send power to the string tracker modules 230 when or if movement of one or more PV strings 120 is required after dark or when the PV panels are not generating power. Power may also be sent by the station hub 150 to monitor the status of each of the PV strings 120 and their string tracker modules 230.

The PV string tracker modules 230 may be parasitically powered from one or more PV strings using DC voltage during daylight hours and, in embodiments, no power may be stored at the string tracker modules 230. When movement or other management activities are required after sunset, power may be sent back, i.e., back-fed, from the inverter 151 via existing DC power cabling 140.

The module controller 250 may act independently to calculate set points, motor positions, and activation and deactivation in support of tracking activities of the PV string 120. This module activity may be powered by parasitic power during the day and by back-fed power during dark periods.

Figure 2B:
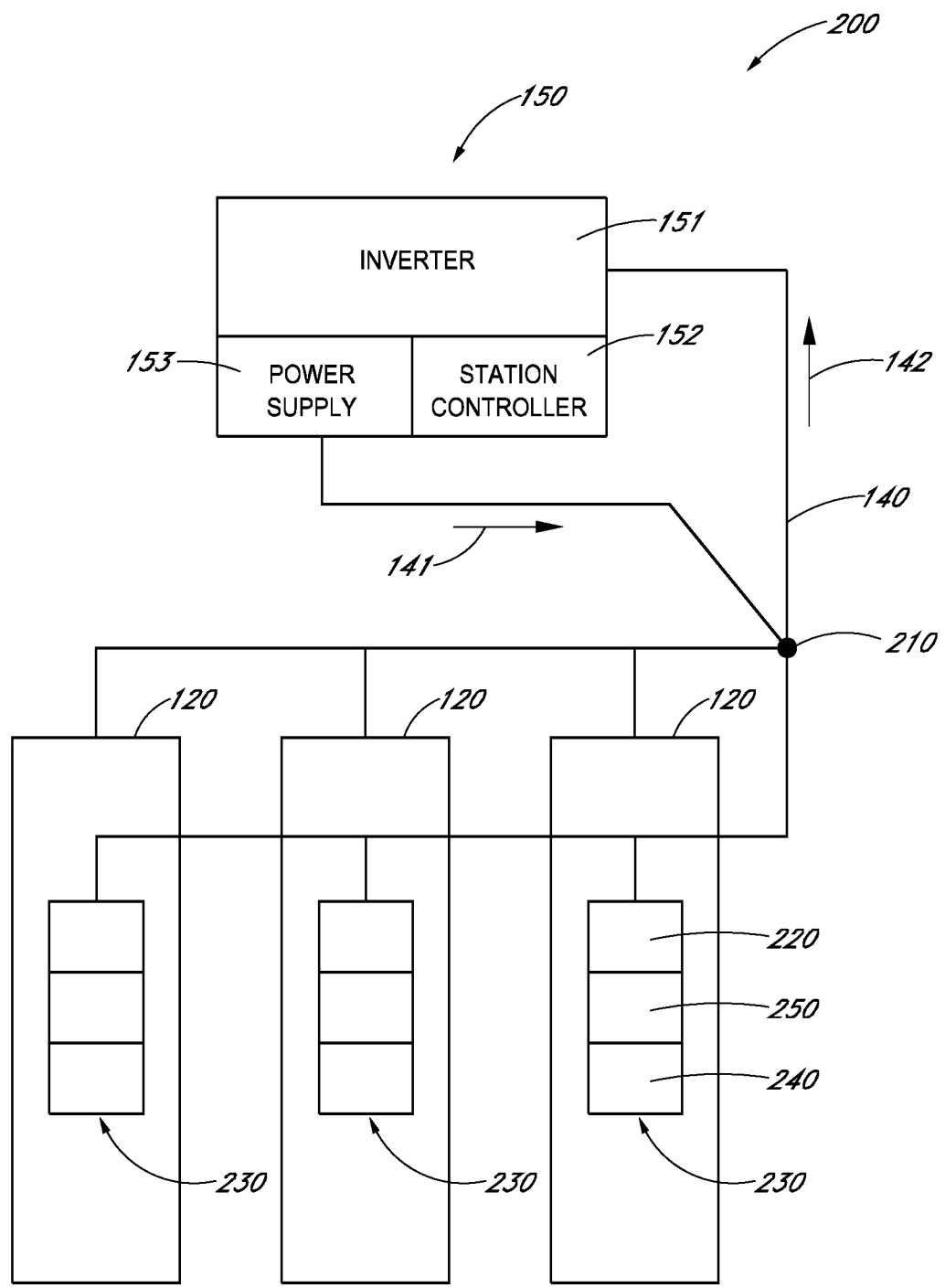

FIG. 2B also shows a schematic of a solar array with solar tracker system 200 as may be employed in embodiments. In addition to the features labeled in FIG. 2A, FIG. 2B also has back-fed power 141 and forward-fed power 142 labelled in FIG. 2B. The inverter and the power supply of the station hub 150 may be connected directly to the power junction 210 using respective lengths of the power cable 140. For example, a first length of the power cable 14 may directly connect the power junction 210 to the inverter 151 to carry forward-fed power 142 from the power junction 210 to the inverter 151, and a second length of the power cable 140 may directly connect the power junction 210 to the power supply 153 to carry back-fed power 141 from the power supply 153 to the power junction 210. The lengths of the power cable may meet at the power junction 210, as shown. The lengths may also meet at a different junction between the power junction 210 and the station hub 150 such that a single length of cable bifurcates into the first length and the second length to connect directly to respective components of the station hub. Thus, the cable routing described above is not limiting, but rather, is illustrative of possible cabling architectures.

Figure 3A:
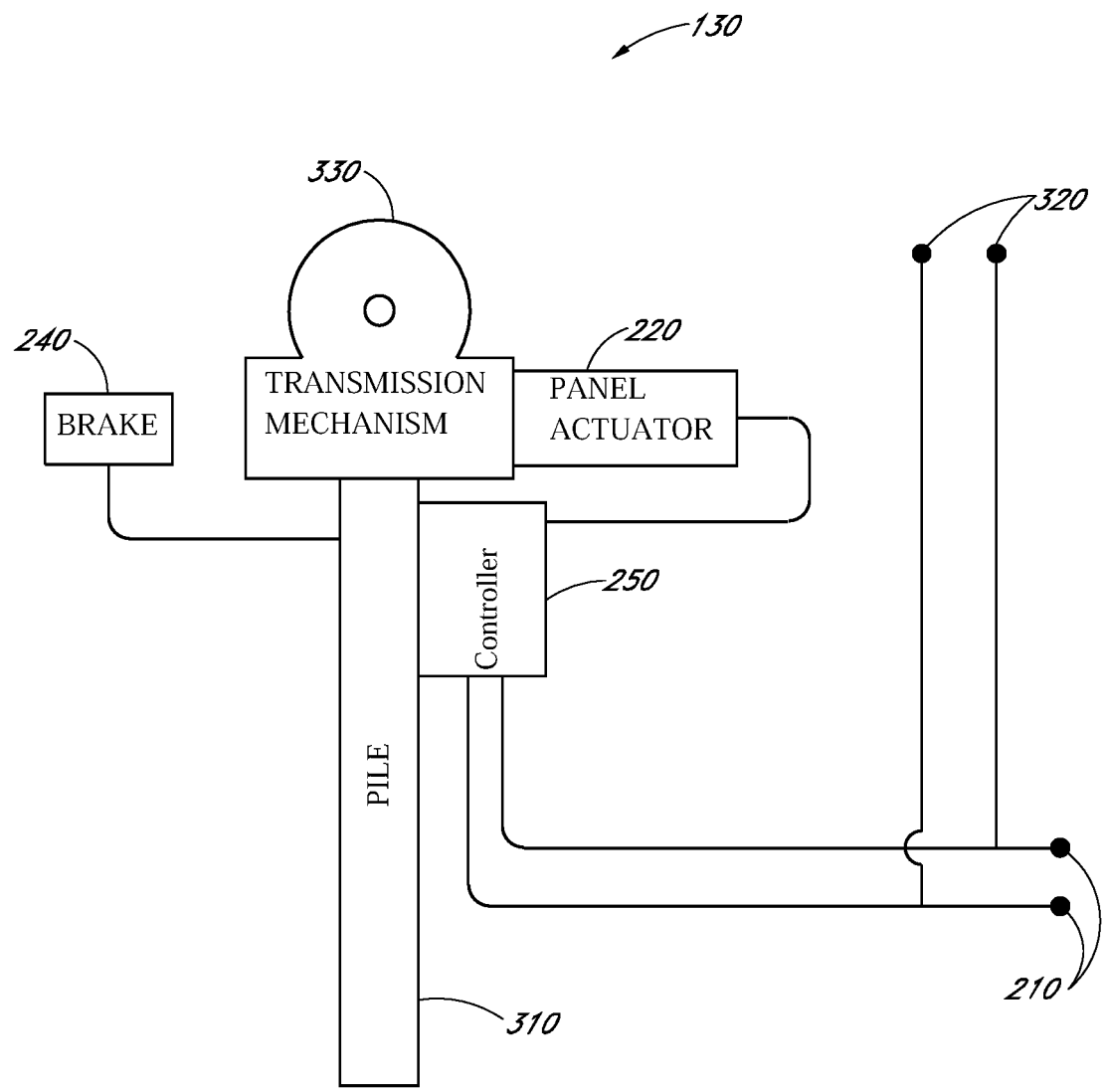
FIGS. 3A-3B show schematics of a PV string tracker module as may be employed in embodiments.
Figure 3B:
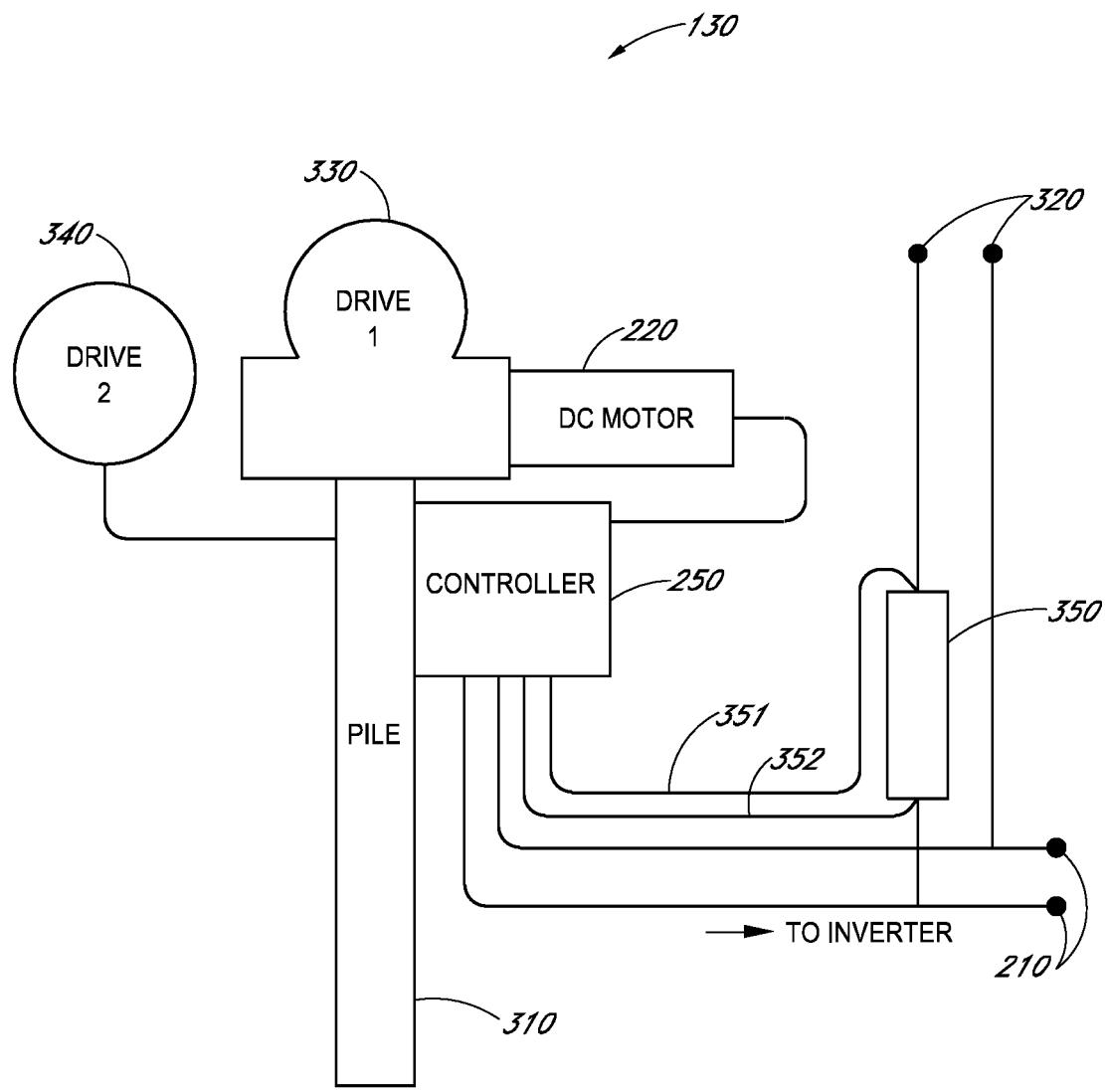

FIGS. 3A and 3B show PV string tracker module 130 as may be employed in embodiments. Labelled in FIGS. 3A and 3B are the tracker module 130, panel actuator 220, PV string terminals 320, transmission mechanism 330, brake 240, pile 310, tracker controller 250, power junction 210, drive 340, sensor 350, and sensor lines 351 and 352. Drive 340 may be a transmission mechanism such as gears of a planetary gear set and may have other configurations as well. The sensor 350 may preferably be a hall effects sensor but may also be a shunt or have another configuration. The tracker module 130 may orient the corresponding PV strings as required for solar tracking and/or system stowage. Accordingly, the tracker module may include the pile 310 supporting a transmission mechanism 330, e.g., a slew drive, linkage, or other mechanical drive mechanism to convert mechanical power from the panel actuator 220 into movement of the PV string. The panel actuator 220 may be operatively coupled to the PV string through the transmission mechanism to affect movement of the PV string. The panel actuator 220 may be, for example, a linear or rotary actuator, such as an electrical DC motor, e.g., a DC stepper motor and may be sized for a 10 kW back-fed power supply. Other sizes may also be used and may be sized to accommodate inverter capabilities from the system hub or central inverter.

The tracker module 130 may also include a brake 240 having a brake solenoid to limit movement of the panel actuator and/or the transmission mechanism. The panel actuator 220 may be operatively coupled to the tracker controller 250 in that the tracker controller 250 may provide electrical power and/or electrical signals to drive the panel actuator 220. Accordingly, the tracker controller 250 may serve as an electrical or control interface between the tracker module 130 and the other components of the solar tracker system 100. The tracker controller 250 may also be used in commissioning. This commissioning may include row level activation and component changes. Calibration and recalibration may also be performed as commissioning activities by the controller 250. Safety techniques, such as hard stopping for gross recalibrations of 3.5°±may be performed by the controller. Commissioning may include determining pitch, roll, and yaw for each PV panel or PV string or PV array relative to Cartesian coordinates. Fine calibration of the PV panel orientation may be formed by the controller 250, as well as by other components of the solar tracker system 100. The tracker controller 250 may be readily replaceable through quick connects and other techniques to allow for service or replacement. The tracker controller 250 may be configured for actuator control to supply power for constant or varied travel rates and to cease power supply when an actuator hits a hard stop or a movement operation has been completed. The tracker controller 250 may also perform homing services on initial power-up and may be used for local sun sensing calibration of the PV string on start up or for recalibration activities. Default safety modes may also be performed by the tracker controller 250. For example, loss of communications and fault sensing may trigger the controller 250 to place the PV string in stow mode.

During nighttime the tracker controller 250 may be dormant as little if any nighttime movement may be preferably performed. However, when nighttime movement is to be performed, the controller 250 may serve to energize back-fed power through communications with the station hub 150 or other component of the system 100. A "wake-up" message may be sent by a controller 250 to other controllers 250 over power lines or wirelessly and may also be sent to other components of the solar tracker system 100 over power lines or wirelessly. Now active or listening for further instructions the controllers and one or more station hubs may operate to send back-fed DC power to the tracker modules 130 in order to move one or more the strings of PV panels. This movement may be choreographed and staged to conserve power, use existing power, stay within existing power cable limits, and to accommodate other parameters as well. Once one or more of the controllers 250 are active regular communication channels may be employed for communications.

The tracker controller 250 may include controller terminals 320 electrically connected to conductors of the power cable at the power junction. Similarly, the tracker controller 250 may be electrically connected in parallel with the PV string. For example, the conductors leading from the controller terminals to the power junction may also be joined with respective PV string terminals of the PV string.

In some embodiments, every tracker controller of the solar tracker system may receive power from the PV strings in parallel. That is, several PV strings in a PV string row may be connected in parallel with each other and to the PV string terminals. Thus, even if one PV string in the PV string row fails, the tracker controller 250 may still receive power from the PV string terminals and/or the power junction. The tracker controller 250 may be electrically connected in parallel with the PV strings in numerous configurations, as described below.

Figure 4A:
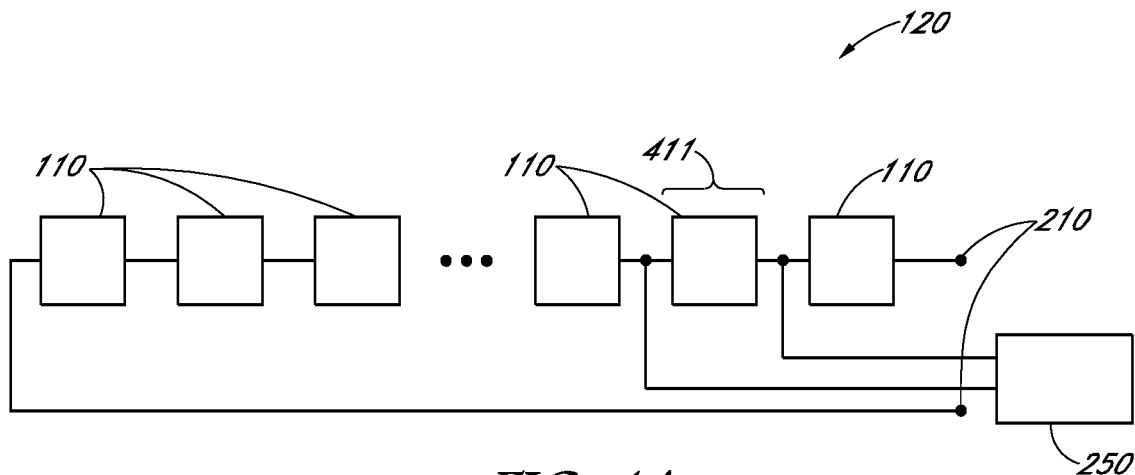
FIGS. 4A-4C show schematics of a tracker module controller electrically coupled in several ways to a PV string as may be employed in embodiments.

FIG. 4A shows a schematic view of a tracker controller electrically connected in parallel with a photovoltaic string as may be employed in embodiments. The tracker module controller 250 may be electrically connected in parallel with a segment 411 of the PV string 120. In embodiments, the PV string 120 may include several PV panels 110 wired in series with the power junction 210. That is, the PV string terminals of the PV string 120 may be joined to the power junction 210 such that the PV string outputs the forward-fed power to the power junction 210. In embodiments, electrical leads from the tracker controller 250 may electrically connect to a serial lead of the PV string 120 at locations that place the tracker controller 250 in parallel with a subset segment of the PV panels. For example, the tracker controller 250 may be electrically connected in parallel with fewer than all, e.g., only one, of the PV panels 110 in the PV string 120. Thus, the segment 411 may include one or more of the PV panels 110 of the PV string 120, and the tracker controller 250 may receive only a portion of the forward-fed power generated by the PV string 120. More particularly, the tracker controller 250 may receive the portion of the forward-fed power generated by the segment 411.

Figure 4B:
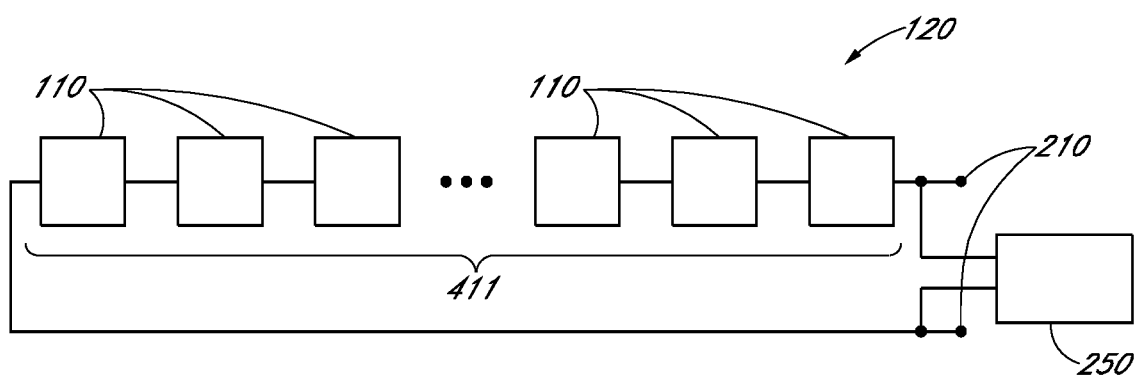

FIG. 4B shows a schematic view of a tracker controller 250 electrically connected in parallel with a photovoltaic string 120 as may be employed in embodiments. The tracker controller may include electrical leads that electrically connect to the serial lead of the PV string at locations that place the tracker controller in parallel with all of the PV panels of the PV string. Thus, the segment 411 may include all of the PV panels 110 of the PV string 120. In so doing, the entire portion of the forward-fed power may be received by the tracker controller 250.

Figure 4C:
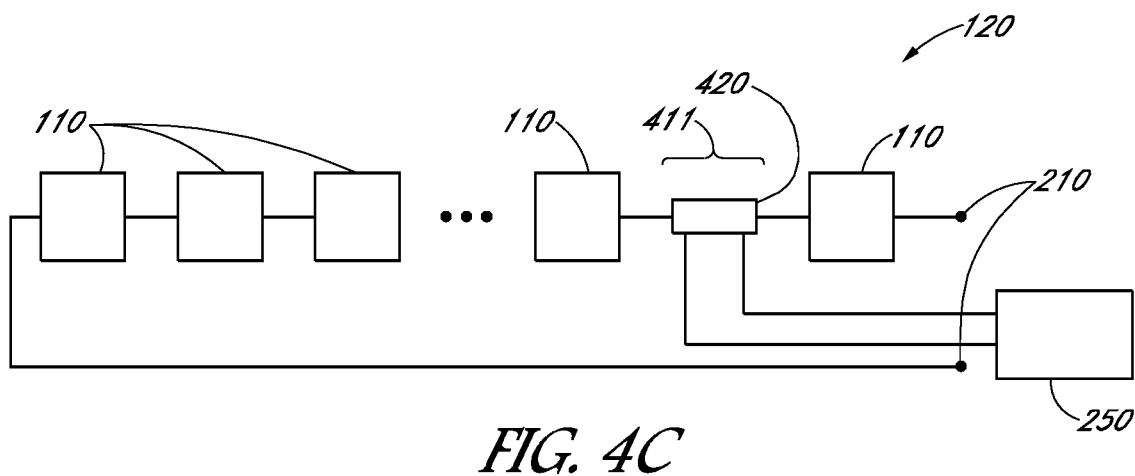

FIG. 4C shows a schematic view of a tracker controller electrically connected in parallel with a photovoltaic string as may be employed in embodiments. The PV string 120 may include an electrical load 420 connected in series with the PV panels 110 of the PV string 120. The tracker controller may include electrical leads that electrically connect to the serial lead of the PV string at locations that place the tracker controller in parallel with the electrical load. Thus, the segment 411 may include the electrical load and the tracker controller 250 may receive the portion of forward-fed power across the load 420.

In each of the electrical configurations described above with respect to FIGS. 4A-4C, the tracker controller 250 may receive operational power from one or more PV strings. For example, each PV string row may include 4-10 PV strings, e.g., 6 PV strings, and thus, the tracker controller may receive power from several PV strings. Thus, when the PV strings are generating electricity and providing forward-fed power to the power cable, the tracker controller may be parasitically powered from the forward-fed power. For example, during daytime a sufficient amount of forward-fed power may exist at the power junction to operatively power the tracker control system. At some point, however, the forward-fed power at the power junction may be insufficient to operatively power the tracker control system. At that point, the station hub of the solar tracker system may back feed power to the tracker control system, as described below.

The electrical configurations described above, e.g., the tracker controller electrically connected in parallel with the segment of the PV string, is illustrative and not limiting. For example, the tracker controller may be electrically connected in series with the segment of the PV string. Thus, forward-fed power may be delivered from the PV string through the tracker controller to the power junction. Similarly, in some embodiments, a PV string can have several PV panels electrically connected in parallel. As yet another example, a combination of series and parallel connections can be employed among the PV panels and/or between the PV panels and the tracker controller.

Figure 5:
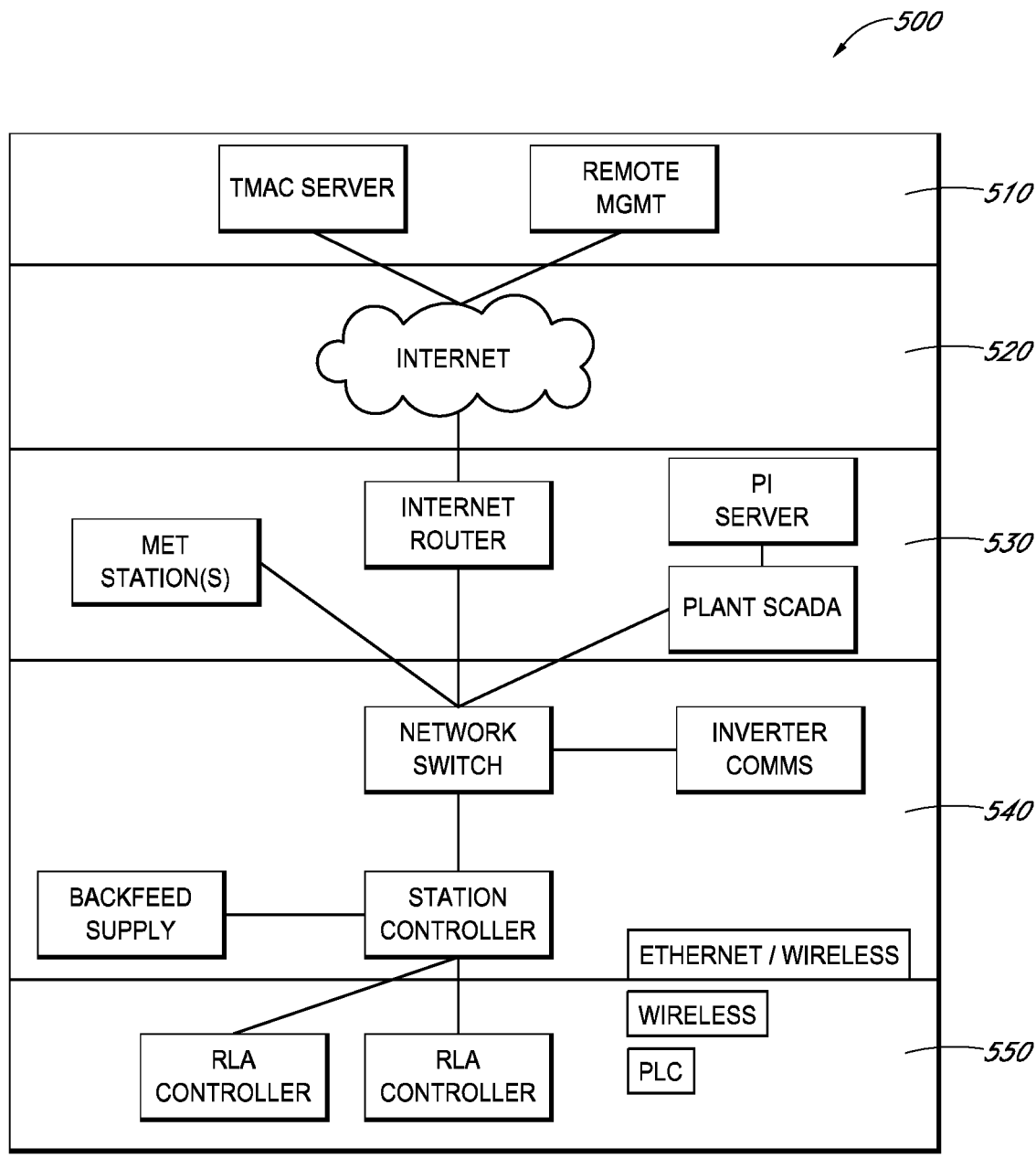
FIG. 5 shows a schematic of vertical communication topology as may be employed in embodiments.

FIG. 5 shows communication topology as may be employed at various levels in embodiments. This communication topology 500 includes a management level 510, the Internet 520, a plant network level 530, a station hub 540, and a tracker module 550. As can be seen, the station hub 540 may include various communication modules including inverter communications, a network switch and an Ethernet interface. The hub 540 may also include wireless communication components. The tracker module 550 may include wireless and PLC communication modules as well as single or multiple controllers. The remote management layer 510 shows that remote management communications may include servers separated from the PV array by the Internet 520. This management layer 510 may be able to perform some or all of the activities and functions for the PV array that may be performed at the station hub or the tracker module. Data compression and compact communication protocols may be used to bandwidth usage and for processing efficiencies.

Figure 6:
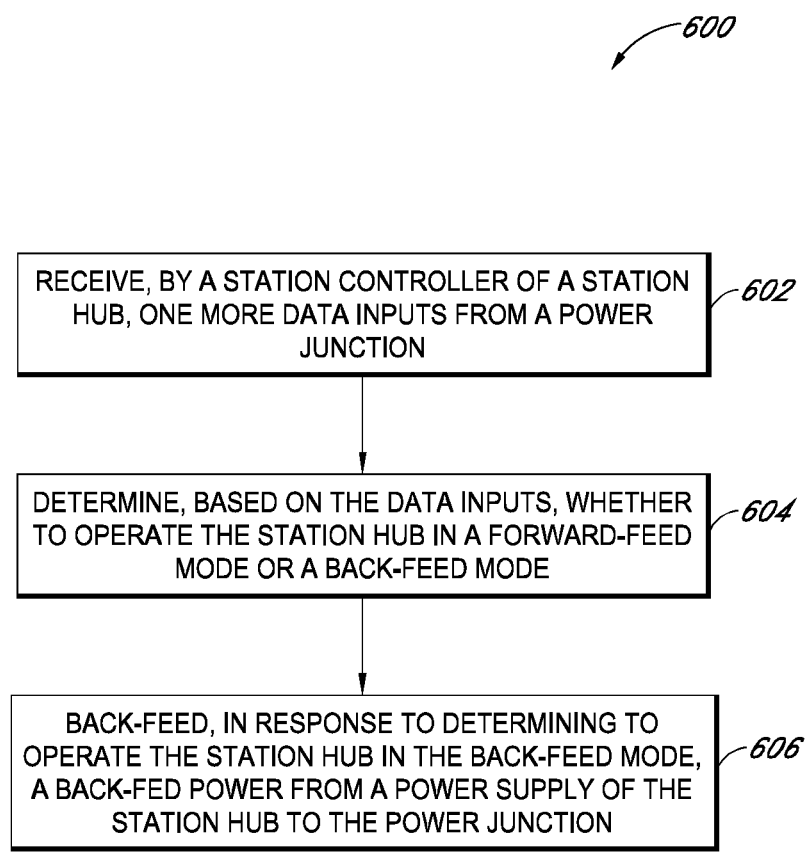
FIG. 6 shows a flowchart of a process for operating a solar tracker system as may be employed in embodiments.

FIG. 6 illustrates a flowchart of a method 600 of operating a solar tracker system as may be employed in embodiments. At operation 602, the controller of the station hub may receive one or more data inputs. For example, the data inputs may include inputs used by the station controller to determine whether to operate the station hub in the forward-fed mode or the back-fed mode. More particularly, the data inputs may include electrical signals, e.g., sensor measurements, indicating whether sufficient power exists at the power junction to operatively power the tracker control system. Thus, the sensor measurements may indicate a current value or a predicted value of the forward-fed power at the power junction. As such, the sensor measurements may include measurements of an electrical power at the power junction, an electrical voltage at the power junction, or an electrical current at the power junction. Such measurements may be instantaneous indicators of the forward-fed power currently being generated by the PV string rows that is available to the tracker controllers. Other signals include, for example, electrical alarm error states. For example, the station controller may receive an alarm signal from the inverter indicating that the forward-fed power has dropped below a predetermined threshold power level. Similarly, the tracker controller may be configured to measure local power characteristics and to provide a back-feed power request to the station controller when the forward-fed power available to the tracker controller drops below a predetermined threshold. The data inputs may also include predictive data, such as a time of day or a geographic location of the photovoltaic string that may be used to predict whether the forward-fed power at the power junction may soon drop below a threshold level.

At operation 604, based on the data inputs, the station hub may determine whether to operate the station hub in the forward-feed mode or the back-feed mode. More particularly, one or more of the station hub components, such as the station controller or the inverter may perform the determination operation. For example, the station controller may use the data inputs as factors in an algorithm to determine whether or not to back-feed power from the power supply to the power cable. As described above, the station controller may determine to operate the station hub in the forward-feed mode when the data inputs indicate that sufficient forward-fed power exists at the power junction to operatively power the tracker module control system. By contrast, the station controller may determine to operate the station hub in the back-feed mode when the data inputs indicate that insufficient forward-fed power exists at the power junction to operatively power the tracker module control system.

In addition to determining whether sufficient forward-fed power is available to the tracker module controllers, determining whether to operate the station hub in the back-feed mode may also include determining whether the tracker module control system requires the back-fed power. For example, there may be insufficient parasitic power available to the tracker module controller during nighttime, however, if there is no need to move the PV strings, back-feeding power to the tracker module controllers may be inefficient. Accordingly, the station controller may determine from the data inputs that a requirement exists to move the PV string, e.g., for nighttime or weather stowage.

At operation 606, in response to determining to operate the station hub in the back-feed mode, the station hub may back-feed the back-fed power to the tracker module controllers. For example, the station controller may control the power supply to output the back-fed power to the power junction through the electrical bus and the power cable. The tracker module controllers may therefore receive operational power from the power junction to move the PV string rows.

Figure 7:
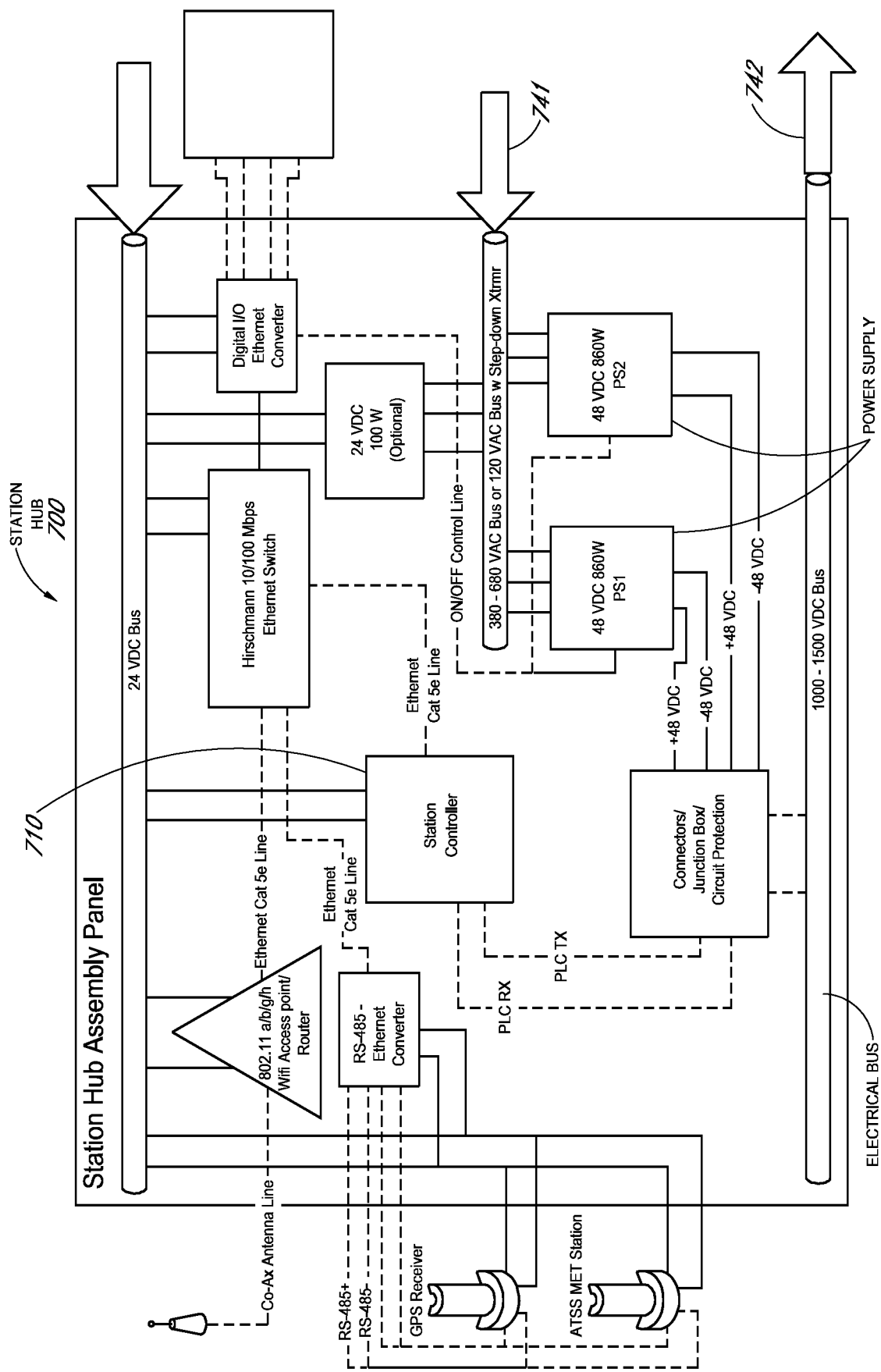
FIG. 7 shows a schematic of a station hub as may be employed in embodiments.

FIG. 7 shows a schematic view of a station hub 700 as may be employed in embodiments. The station hub 700 may include the station controller 710 to determine whether to operate the station hub in a forward-fed mode or a back-fed mode. For example, the station controller 710 may determine to operate in the forward-fed mode when sufficient forward-fed power exists at the power junction to power the tracker control system. By contrast, the station controller 710 may determine to operate in the back-fed mode when insufficient forward-fed power exists at the power junction to power the tracker control system. When the station hub 700 is operating in the forward-fed mode, the tracker controller may parasitically receive the portion of the forward-fed power from the segment of the PV string as described above. When the station hub 700 is operating in the back-feed mode, however, the tracker controller may instead receive the back-fed power from the power junction. The station hub 700 is shown with internal voltages±48 VDC, however, other voltages may also be used. Back-fed power is shown at 741 while forward-fed power is accessible at cable 742. Internal power line 743 may provide 24 VDC to power internal components of the hub 700.

As described above, the power cable may electrically connect the station hub to the power junction. The power cable may transfer the forward-fed power to the power grid through the station hub. For example, the power cable may deliver forward-fed power to the inverter, and the inverter may convert DC power from the PV string rows into AC power to feed to the power grid. The power cable may also transfer the back-fed power from the station hub to the power junction. For example, the power supply may convert AC power from the power grid to DC power that can be fed back to the tracker controllers. Accordingly, the power supply of the station hub may connect to the same electrical bus of the station hub that is connected to the power cable and/or the inverter. The power supply may only deliver power to the electrical bus, however, when controlled to do so by the station controller. For example, the station controller may control the power supply to deliver the back-fed power to the power cable when there is not enough power to run the tracker controller systems using parasitic power, and when there is a need to move the PV string rows.

Notably, the forward-fed power delivered to the power grid through the electrical bus of the station hub may be different than the back-fed power delivered by the power supply to the electrical bus. During daytime, the PV string rows may generate forward-fed power having a DC voltage varying between 300-1500 volts, as an example, and the forward-fed voltage may drop to zero during nighttime. At nighttime, the power supply may back feed the back-fed voltage, e.g., 48 volts, to the electrical bus. There are several reasons that this difference in voltage may be beneficial. First, the lower back-fed voltage may have safety advantages. Second, the low back-fed voltage allows the PV string rows to electrically appear as open circuits. More particularly, the PV panels in the PV string rows act as diodes, and when the back-fed voltage rises to a threshold level, the PV panels act as forward bias diodes, making the back-feed method less efficient. Accordingly, although the maximum back-fed voltage may be dependent on PV module type and/or a number of PV panels placed in series within the PV strings, the maximum back-fed voltage may be set at a level that avoids forward biasing of the PV panels.

The station controller may be connected to the power supply, a switching device for switching back-fed power to the electrical bus, and the inverter. Similarly, the station controller may be electrically connected to the tracker control system. Furthermore, the station controller may be able to communicate to control all of these components. More particularly, power and communications may be delivered over the power cable at the same time. In an embodiment, the tracker controller is configured to electrically communicate with the station controller over the power cable. For example, communications may be transferred between the tracker controller and the station hub over the power cable using power-line communication. Power-line communications may be carried out using, e.g., narrowband power-line communication or broadband power-line communication. Alternatively, the tracker controller may communicate with the station controller via wireless or other network communication standards. By way of example, and not limitation, wireless communications may include standards-based wireless communications having high bandwidth, e.g., 150 Mbps, and may be effective over a range of 300 meters or less. Communications between the station controller and the tracker controller may also be provided using other wireless communication technologies, such as Bluetooth communications, ZigBee communications, or IPv6 over Low-Power Wireless Personal Area Networks communications, to name a few. Furthermore, the controllers may be equipped with the requisite electronic hardware to facilitate such communications, including modems, routers, antennas, etc.

In embodiments, communications between the station controller and the tracker controller may be used to only back-feed power when the tracker control system requires the back-fed power to move a photovoltaic string. For example, although back-fed power may be available to the solar tracker system at all times, it may only be required during nighttime (or near dawn or dusk) when the PV string must be moved for some reason, e.g., to stow the PV string due to inclement weather conditions. Accordingly, communications between the tracker controller and the station controller may include a wake-up sequence, such as a wake-up signal that can be delivered from the station controller to the tracker controller. Furthermore, the wake-up sequence may include a waiting period to allow the tracker controller to start up, followed by subsequent communications to query the tracker controller and/or to deliver power to the tracker controller to drive the panel actuator.

Figure 8:
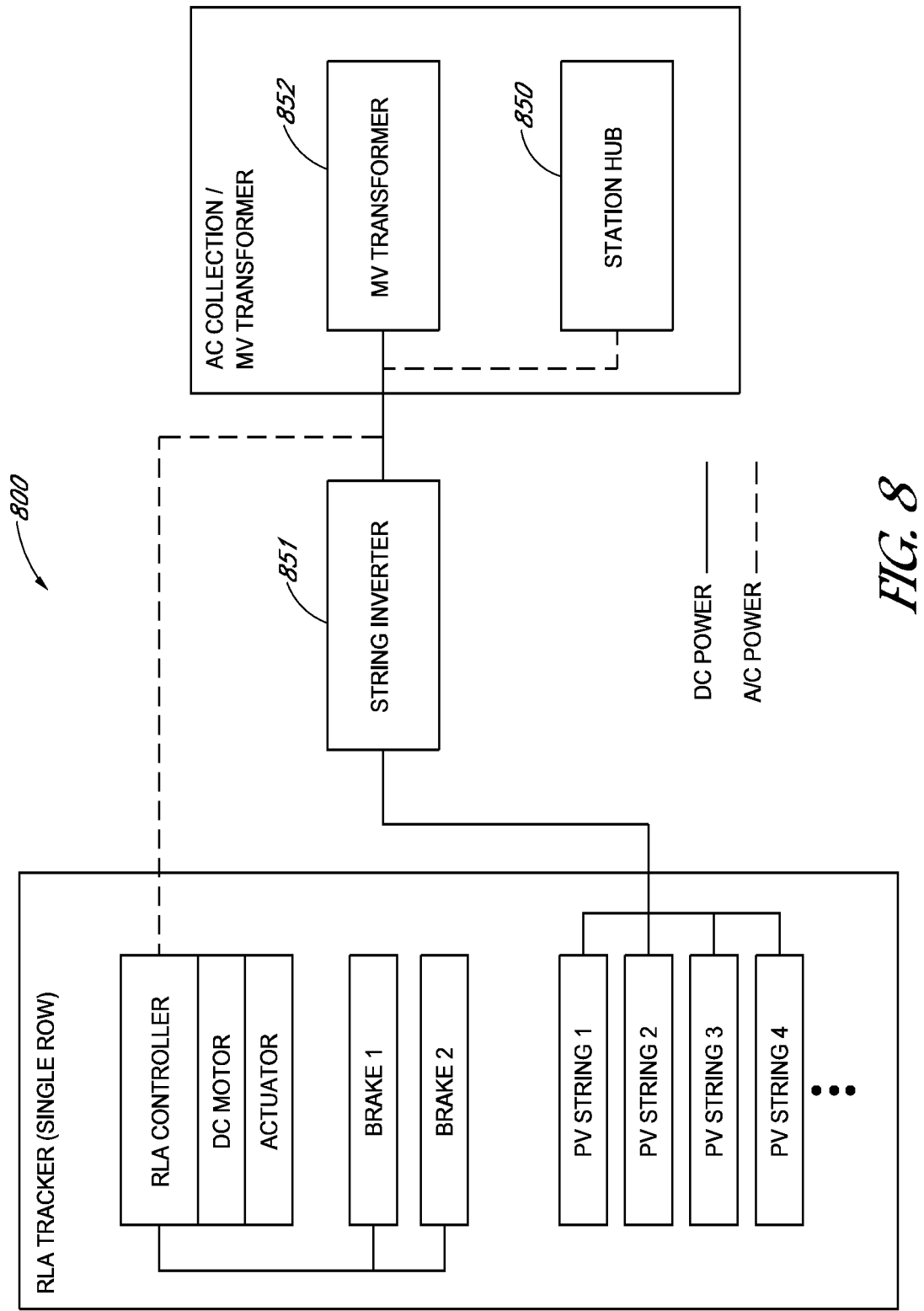
FIG. 8 shows a schematic of central string inverter topology as may be employed in embodiments.

FIG. 8 is a schematic of central inverter support topology as may be employed in embodiments. The string inverter

851 may be receiving DC power from a string of PV panels and may be supplying AC power to a transformer 852 and a station hub 850. This topology may be employed for central inverter solar systems and may provide swappable power supplies for PLC modules and other components using parasitic power. In these central inverter topologies, the station hub 850 may be integrated with the transformer 852. When powered by the central inverter components of the tracker system would be AC components rather than DC components.

Figure 9:
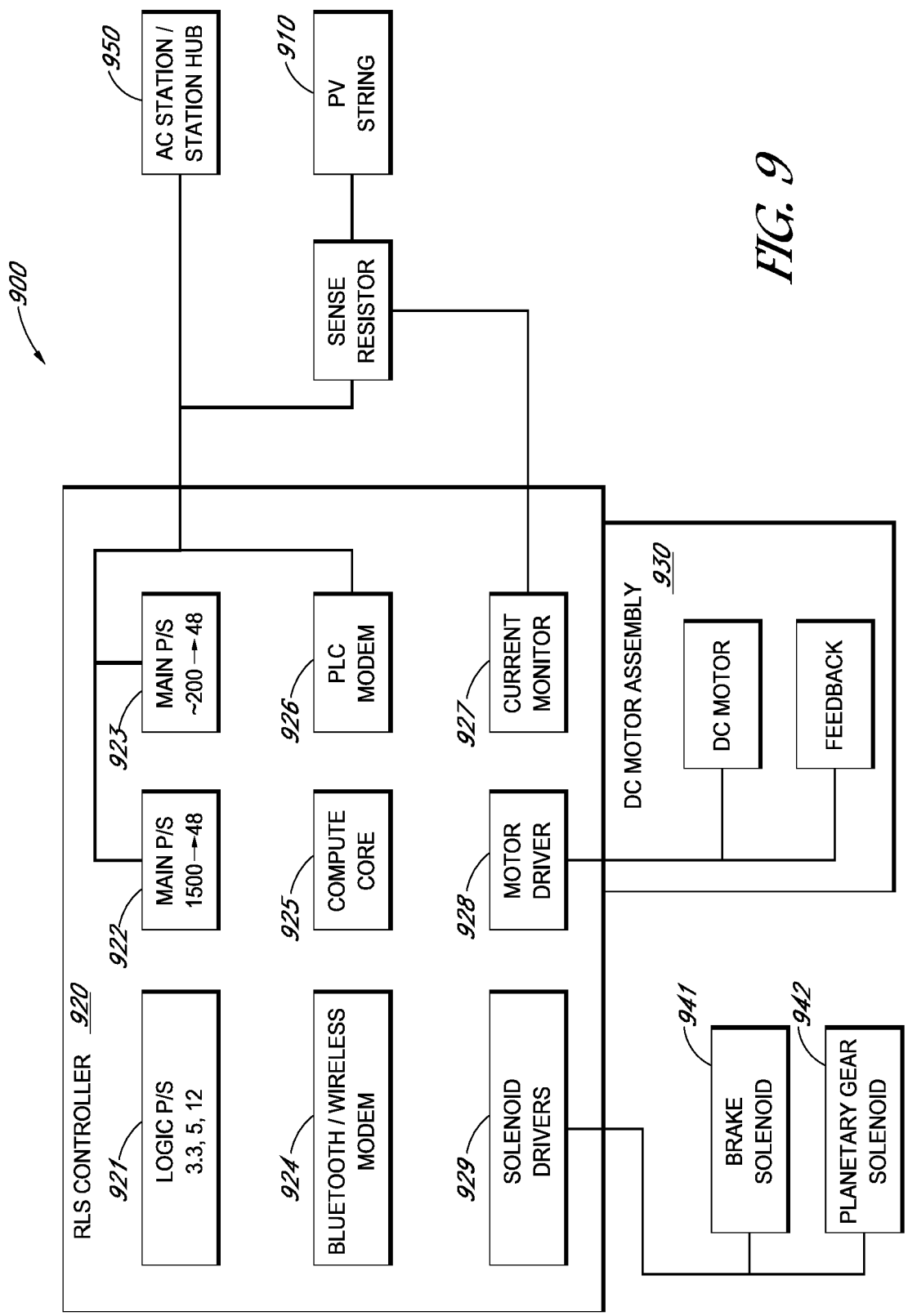
FIG. 9 shows a schematic of tracker module architecture as may be employed in embodiments.

FIG. 9 is a schematic of a tracker module controller as may be employed in embodiments. The controller 920 architecture can be seen in FIG. 9 along with connections to other components. The controller 920 in FIG. 9 is shown with logic power supply 921, main power supply interface 922, main power supply interface 923, Bluetooth modem 924, core 925, PLC modem 926, solenoid drivers 929, actuator driver 928, and current monitor 927. The logic power supply 921 may be used to generate or interface with DC logic voltages of 3.3V, 5V, and 12V as well as other logic voltage ranges. The main power supply interface 922 and 923 may be configured to accept mains power for powering the motor 930 or other actuator. These interfaces 922 and 923 may convert main power to lower operational voltages as well. These interfaces 922 and 923 may also monitor power from the AC station 950 to determine if is back-fed power is being supplied. The controller 920 may determine that back-fed power is being supplied by the amount of voltage being measured. Voltages below 600V may be considered to be back-fed voltages while voltages of 600V or more may be categorized as forward-fed voltages. The controller 920 may also control solenoids 941 and 942, which may be used to activate or engage brake 941, planetary gear 942 or whatever other actuator configuration is being employed with the motor.

In embodiments, the controller 920 may be a semi-autonomous tracking controller, which can operate for hours without external commands. The controller 920 may rely on the station hub 150 for time, location, stow condition, and communication gateway functionality and data. The DC motor 930 may rely on the controller for actuation and control. The motor driver 928 may communicate with a magnetic encoder in the motor 930 that can be used for position feedback. This position feedback may serve to reduce or eliminate the necessity for an inclinometer as tilt angle or other position feedback may be provided by the position feedback. The motor driver 928 may also support hard stop homing, where a PV panel may be reset to a home position after reaching a hard stop on a path of travel. The PLC modem 926 may interject communications over power lines while the Wireless Modem 924 may be used to interject communications over wireless protocols, such as Bluetooth®. The current monitor 927 may enable detection of sun position and inter-row shading based on voltages detected and expected voltages. String current may be measured using a remote sense device and sent to controller 920 while string voltage may be available at the main power supply. The current sense may be performed by an in-line device on one or more of the strings and sent back to the current monitor 927. These measurements may be used to determine PV power, which can be used for determining sun position and inter-row shading.

The wireless modem 924 may be used for a local UI and may enable pairing using Bluetooth® or other protocol, with a phone, tablet, or PC using a custom UI application. The modem 924 may also be used for system communications and allow for diagnostics and control on a primary basis as well as on a secondary, backup, basis.

As explained above with FIGS. 4A-4C, the power supplies 921, 922, and 923 may be connected in parallel with a full string of PV panels generating 1500 VDC max. This VDC may be used by the controller 920 for daily operation. At night and at other times, when this 1500 VDC is not available, the AC station may provide 48 VDC back to the interfaces 922 and 923. Interface 921, the logic interface, may also receive back-fed voltage and may convert it to lower voltages for use by logic circuitry at 3.3V, 5V, 12V, etc. The 48 VDC or other voltage, e.g., 420 VDC, may also be used to drive the motor 930 and one or more solenoids, such as 941 and 942.

Figure 10:
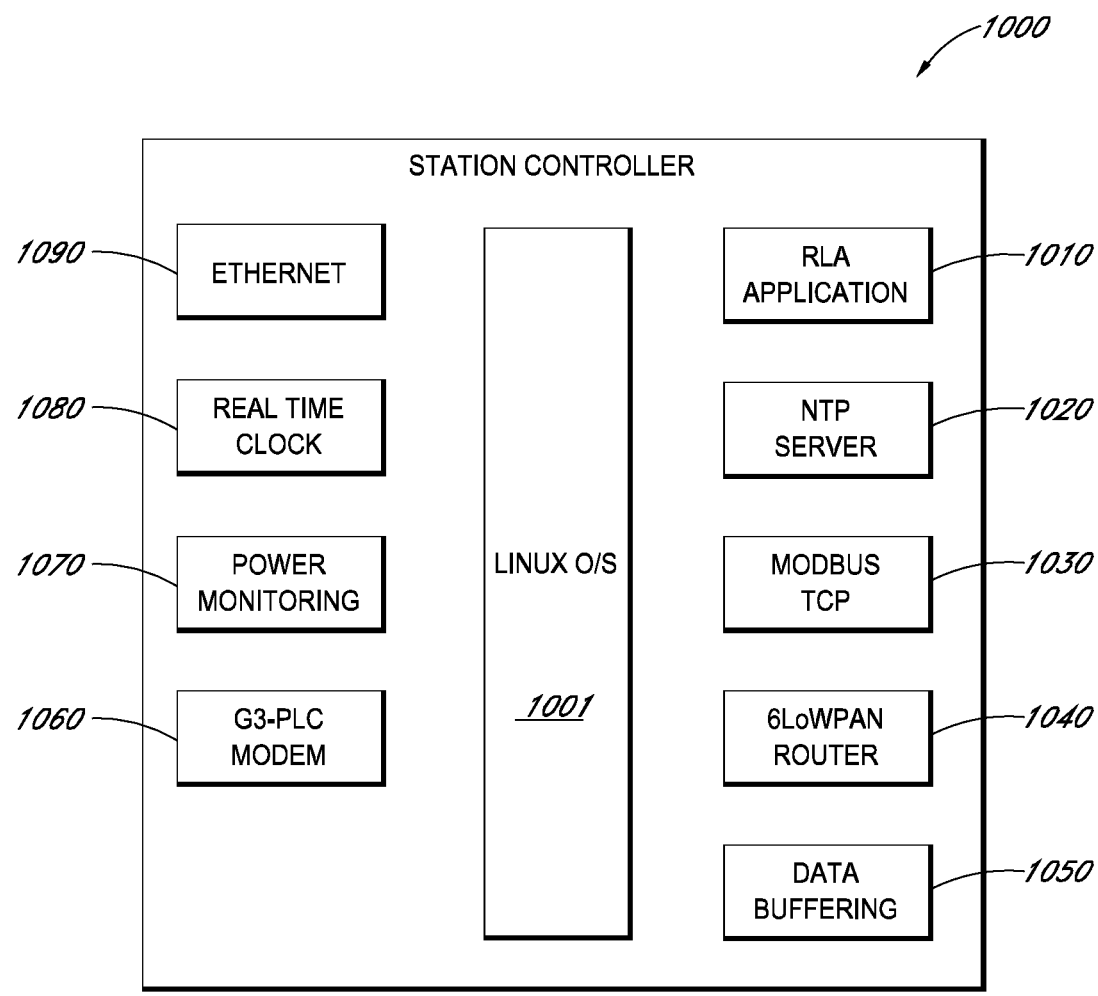
FIG. 10 shows a schematic of station controller architecture as may be employed in embodiments.

FIG. 10 is a schematic view of a supervisory station controller 1000 as may be employed in embodiments. This supervisory controller 1000 may be in the station hub as well as in addition to the module controllers and the station hub described above. This supervisory controller 1000 may be used for automated metering applications as well as run custom system wide applications. The supervisory controller may use wireless protocols to communicate with the hub and the module controllers. Labelled in FIG. 10 are the OS 1001, Ethernet interface 1090, clock 1080, power monitor 1070, Modem 1060, RLA application 1010, NTP server interface 1020, MODBUS TCP 1030, router 1040, and buffer 1050.

Figure 11:
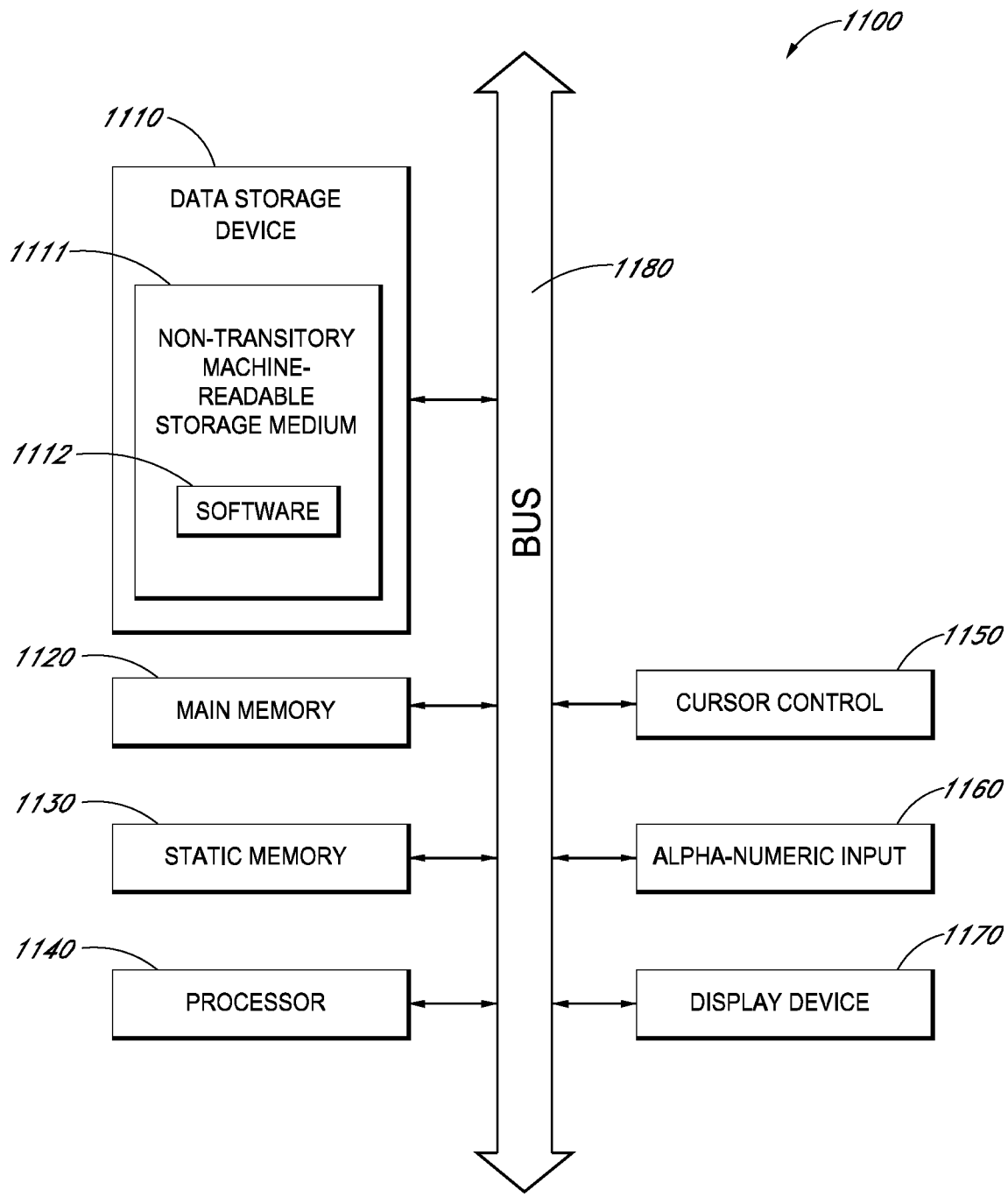
FIG. 11 shows a schematic of system manager architecture as may be employed in embodiments.

Referring to FIG. 11, a schematic view of a system manager 1100 as may be employed in embodiments. The computer system manager may be incorporated in one or more of the tracker controller or the hub controller to perform various operations of those controllers as described above. The computer system is exemplary, and embodiments of the invention may operate on, or be controlled by, a number of different computer systems including general purpose networked computer systems, embedded computer systems, routers, switches, server devices, client devices, various intermediate devices/nodes, stand-alone computer systems, and the like. In an embodiment, computer system includes an address/data bus 1180 for communicating information. For example, the computer system may include a main logic board having a central processing unit 1140 coupled to the bus for processing information and instructions. The main logic board of the computer system may also include data storage features such as a computer usable volatile memory 1120, e.g., dynamic random access memory (DRAM), coupled to the bus for storing information and instructions for the central processing unit. Computer usable non-volatile memory 1130, e.g. read only memory (ROM), may also be coupled to the bus and/or mounted on the main logic board for storing static information and instructions for the central processor 1140. In addition to processing and memory hardware, the computer system may include various input and output devices. For example, the computer system may include an alphanumeric input device 1160 and/or cursor control 1150 device coupled to the bus for communicating user input information and command selections to the central processing unit. Likewise, the computer system may include a display device 1170 coupled to the bus for displaying information to a user.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A solar PV array tracker system, comprising:
    a photovoltaic string having a plurality of photovoltaic panels electrically connected in series, wherein the photovoltaic string is electrically connected to a power junction to output a forward-fed power to the power junction;
    a tracker module including a panel actuator operatively coupled to the photovoltaic string and to a PV panel movement tracker controller, wherein the PV panel movement tracker controller is electrically connected in parallel with a DC output segment of the photovoltaic string, and
    a station hub including:
        a station controller configured to determine whether to operate the station hub in a forward-feed mode or a back-feed mode;
        an inverter electrically connected to the power junction, wherein the inverter receives the forward-fed power from the power junction when the station hub is operating in the forward-feed mode; and
        a power supply electrically connected to the power junction, wherein the power supply outputs a back-fed power to the power junction when the station hub is operating in the back-feed mode.

2. The solar PV array tracker system of claim 1, wherein the PV panel movement tracker controller receives a portion of the forward-fed power from the segment when the station hub is operating in the forward-feed mode, and wherein the PV panel movement tracker controller receives the back-fed power from the power junction when the station hub is operating in the back-feed mode.

3. The solar PV array tracker system of claim 2, wherein the forward-fed power includes a rated system voltage, and wherein the back-fed power includes a back-fed voltage less than 10% of the rated system voltage.

4. The solar PV array tracker system of claim 3, wherein the rated system voltage is greater than 1000 volts, and wherein the back-fed voltage is less than 100 volts.

5. The solar PV array tracker system of claim 4, wherein the segment includes one or more of the plurality of photovoltaic panels.

6. The solar PV array tracker system of claim 4, wherein the segment includes an electrical load connected in series with the plurality of photovoltaic panels.

7. The solar PV array tracker system of claim 1 further comprising a power cable electrically connecting the station hub to the power junction, wherein the power cable transfers the forward-fed power and the back-fed power between the station hub and the power junction, and wherein the PV panel movement tracker controller is configured to electrically communicate with the station controller over the power cable using power-line communication.

8. The solar PV array tracker system of claim 1, wherein the PV panel movement tracker controller is configured to communicate with the station controller wirelessly.

9. A method of operating a solar PV array movement tracker system, comprising:
    receiving, by a station controller of a solar PV array movement tracker system station hub, one or more data inputs from a PV panel movement tracker controller through a power junction, the station hub electrically connected through a DC bus to the power junction;
    determining, by the station controller based on the data inputs, whether to operate the station hub in a forward-feed mode or a back-feed mode; and
    back-feeding, in response to determining to operate the station hub in the back-feed mode, a back-fed power from a power supply of the station hub to the power junction and to a tracker module through the power junction, whereby the tracker module is operable to control one or more panel actuators.

10. The method of claim 9, wherein it is determined to operate the station hub in the forward-feed mode when the data inputs indicate that sufficient forward-fed power exists at the power junction to operatively power a tracker control system, and wherein it is determined to operate the station hub in the back-feed mode when the data inputs indicate that insufficient forward-fed power exists at the power junction to operatively power the tracker control system.

11. The method of claim 10, wherein determining whether to operate the station hub in the back-feed mode further includes determining whether the tracker control system requires the back-fed power to move a photovoltaic string having a plurality of photovoltaic panels.

12. The method of claim 11, wherein the data inputs include a sensor measurement indicating one or more of a current value or a predicted value of one or more of an electrical power at the power junction, an electrical voltage at the power junction, an electrical current at the power junction, an electrical alarm error state, a time of day, or a geographic location of the photovoltaic string.

13. A PV string tracker module comprising:
    a PV panel movement tracker controller configured to receive parasitic power from an array of PV panels when the PV panels are operational in daylight,
    the PV panel movement tracker controller further configured to receive back-fed power when PV panels are not operational,
    the PV panel movement tracker controller is further configured to send one or more data inputs, through a power junction, for receipt by a station controller of a solar PV array movement tracker system station hub, the station hub electrically connected through a DC bus to the power junction;
    wherein the back-fed power is received at the PV panel movement tracker controller through PV panel DC power output cabling, the output cabling electrically connected to the array of PV panels, and
    the station controller determining, based on the data inputs, whether to operate the station hub in a forward-feed mode or a back-feed mode.

14. The PV string tracker module of claim 13 further comprising:
    a panel actuator configured to receive back-fed power and to move the array of PV panels using the received back-fed power.

15. The PV string tracker module of claim 13 wherein the PV panel movement tracker controller is further configured to commission the array of PV panels and to use a panel actuator to determine the angle of inclination of one or more panels in the array of PV panels.

16. The PV string tracker module of claim 13 further comprising:
   a pile supporting the module;
   a first actuator drive coupled to the array of PV panels; and
   a second actuator drive positioned and configured to lock movement of the first actuator drive.

17. The PV string tracker module of claim 13 wherein the PV panel movement tracker controller is configured to determine whether back-fed power or parasitic power is available to the PV panel movement tracker controller.

18. The PV string tracker module of claim 13 wherein the PV panel movement tracker controller comprises a wireless communication transceiver and is configured to communicate with a station hub using the transceiver.

19. The PV string tracker module of claim 13 wherein the PV panel movement tracker controller is configured to communicate with a user via short range wireless connectivity and a graphic user interface for one or more of set up, maintenance, or user management.

* * * * *